United States Patent
Shaw

(10) Patent No.: US 8,423,050 B2
(45) Date of Patent: *Apr. 16, 2013

(54) MOBILE OBJECT LOCATION-BASED PRIVACY PROTECTION

(75) Inventor: Venson M. Shaw, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/298,853

(22) Filed: Nov. 17, 2011

(65) Prior Publication Data

US 2012/0064920 A1    Mar. 15, 2012

Related U.S. Application Data

(63) Continuation of application No. 11/689,196, filed on Apr. 17, 2007.

(51) Int. Cl.
*H04W 24/00* (2009.01)

(52) U.S. Cl.
USPC ............... 455/456.4; 455/404.2; 455/414.2; 455/456.1; 455/456.2; 455/456.3; 455/456.6

(58) Field of Classification Search ............... 455/404.2, 455/414.2, 456.1–456.6
See application file for complete search history.

(56) References Cited

U.S. PATENT DOCUMENTS

| | | | |
|---|---|---|---|
| 6,556,810 B2 | 4/2003 | Suzuki | |
| 6,567,668 B1 | 5/2003 | Valentine et al. | |
| 2004/0155969 A1 | 8/2004 | Hayashi | |
| 2005/0202830 A1 | 9/2005 | Sudit | |
| 2005/0245273 A1 | 11/2005 | Kincaid | |
| 2006/0046746 A1 | 3/2006 | Ranford et al. | |
| 2006/0148465 A1* | 7/2006 | Perdomo et al. | 455/422.1 |
| 2006/0181411 A1* | 8/2006 | Fast et al. | 340/539.13 |
| 2007/0015518 A1* | 1/2007 | Winter et al. | 455/456.1 |
| 2007/0025313 A1 | 2/2007 | Bhagwat et al. | |
| 2007/0032225 A1* | 2/2007 | Konicek et al. | 455/417 |
| 2007/0060171 A1 | 3/2007 | Sudit et al. | |
| 2007/0270167 A1* | 11/2007 | Mardiks et al. | 455/456.4 |
| 2008/0090520 A1 | 4/2008 | Camp et al. | |
| 2009/0197584 A1 | 8/2009 | Snow et al. | |

OTHER PUBLICATIONS

U.S. Appl. No. 11/689,196, filed Apr. 17, 2007, Venson M. Shaw.

\* cited by examiner

*Primary Examiner* — Olumide T Ajibade Akonai
*Assistant Examiner* — Edward Zhang
(74) *Attorney, Agent, or Firm* — Woodcock Washburn LLP

(57) ABSTRACT

A system, method and apparatus for creating and implementing a privacy zone around a mobile object are described herein. A privacy zone is a geographic location proximate to a mobile object in which mobile device functionality is reduced when a mobile device is inside the boundaries of the privacy zone. A locator subsystem tracks the location of the mobile object to update the location of the privacy zone. Further, the locator subsystem monitors for mobile devices that may interface with the privacy zone. Once a mobile device is found to be within a privacy zone, the pre-determined mobile device features will preferably be disabled.

20 Claims, 3 Drawing Sheets

MOBILE OBJECT LOCATION-BASED PRIVACY PROTECTION

CROSS REFERENCE TO RELATED APPLICATIONS

The instant application is a continuation of U.S. patent application Ser. No. 11/689,196, entitled "Mobile Object Location-Based Privacy Protection," filed Apr. 17, 2007, which is hereby incorporated by reference in its entirety

FIELD OF THE INVENTION

This invention relates to wireless communication and, more particularly, to techniques for providing a zone of privacy proximate to a mobile object.

BACKGROUND OF THE INVENTION

Mobile devices today typically have expanded communication functions. In the case of cell phones, for example, a user has access to voice calling, incoming call alert, incoming message alert, text messaging, instant messaging, picture messaging, and video messaging. These and future application capabilities are becoming widely available due to the rapid advancement of digital, wireless technology and the hardware and software integration on the mobile devices, and particularly, mobile phones. Mobile phones have further become highly affordable as a result of the volume of production and rapid cost reduction, and thus, their use has become essentially ubiquitous.

Users typically move freely from location to location with mobile phones and use mobile phone functionality just as freely. Additionally, this use may occur without drawing the attention of others. Further, because of the expansion of wireless telecommunication network coverage, users can increasingly communicate or transfer information from any source location to any destination location, including through the internet or to another user's mobile phone.

The expansion of the use and available features of typical mobile devices has led to concerns about privacy, both of the person and of the location. Today, usually the only counter-measure a company or individual takes to attempt to control this surreptitious activity is to post a physical sign with a warning message to remind people that certain activities are forbidden. The only other alternatives may be to request the user to turn their mobile phone off or not to allow mobile phones into the area at all. Both of these alternatives are rarely well received and may be ineffective, especially considering the small size of cell phones.

Additionally, these counter-measures are rarely effective or practical when the object that is being protected is mobile. For instance, an executive may not want employees in the company recording on a cell phone video of the attendees of a classified meeting. As another example, a high-level government official may not want to be photographed during an inspection of a facility. Unless the location of the object is known beforehand, putting up a sign to warn others may not be realistic and may actually alert the public to the presence of the object.

SUMMARY OF THE INVENTION

In accordance with an aspect of the present invention, a method for establishing and controlling a privacy zone proximate to a mobile object is disclosed. The method comprises the steps of inputting into a database the boundaries of a privacy zone proximate to the location of the mobile object, inputting into a database a mobile communication device function configuration for a mobile communication device while the mobile communication device is located in the privacy zone, wherein the mobile communication device function configuration comprises a list of a plurality of mobile communication device functions to be disabled, determining that a mobile communication device is within the privacy zone, retrieving from the database the mobile communication device function configuration for the privacy zone according to the IMEI (international Mobile Equipment Identity), generating a program signal to program the mobile communication device according to the retrieved mobile communication device configuration, and transmitting the program signal to the mobile communication device.

In another aspect of the invention, a method is described herein for providing a privacy zone proximate to a mobile object. The method comprises the steps of establishing the parameters of the privacy zone by inputting into a database the boundaries of a privacy zone proximate to the location of the mobile object, inputting into a database a mobile communication device function configuration for a mobile communication device according to the IMEI (international Mobile Equipment Identity), while the mobile communication device is located in the privacy zone, wherein the mobile communication device function configuration comprises a list of a plurality of mobile communication device functions to be disabled, generating a request to activate the privacy zone according to the established parameters, transmitting the request to activate, determining the location of the mobile object, determining the location of a mobile communication device, determining if a mobile communication device is located within the privacy zone, and if a mobile communication device is located within the privacy zone, configuring the mobile communication device according to the inputted mobile communication device function configuration.

In a still further aspect of the invention, an apparatus for establishing and controlling a privacy zone proximate to a mobile object is disclosed. The apparatus comprises means for inputting into a database the boundaries of a privacy zone proximate to the mobile object, means for inputting into a database a mobile communication device function configuration for a mobile communication device while the mobile communication device is located in the privacy zone, wherein the mobile communication device function configuration comprises a list of a plurality of mobile communication device functions to be disabled, means for determining the location of the mobile object, means for determining the location of a mobile communication device, means for determining that a mobile communication device is within the privacy zone, means for retrieving from the database the mobile communication device function configuration for the privacy zone, means for generating a program signal to program the mobile communication device according to the retrieved mobile device configuration, and means for transmitting the program signal to the mobile communication device.

In another further aspect of the invention, a system for establishing and controlling a privacy zone proximate to a mobile object is described. The system comprises a storage unit configured to store the boundary of a privacy zone proximate to the mobile object and to store mobile communication device function configuration for a mobile communication device while the mobile communication device is located within the privacy zone, wherein the mobile communication device function configuration comprises a list of a plurality of mobile communication device functions to be disabled, an input module in communication with the storage unit, wherein the input module comprises an interface for inputting the boundary of the privacy zone and mobile communication device function configuration for a mobile communication device while the mobile communication device is located within the privacy zone, a mobile object locator subsystem, wherein the mobile object locator subsystem is configured to track the location of the mobile object, a mobile communication device locator subsystem, wherein the mobile communication device locator subsystem is configured to output the location of a mobile communication device, a processor in communication with the mobile object locator subsystem and the mobile communication device locator subsystem, wherein the processor is configured to produce a detection signal upon a determination that a mobile communication device is within the privacy zone, and a server configured to 1) receive the detection signal, 2) retrieve from the storage unit the mobile communication device function configuration for the privacy zone, and 3) generate a program signal to program the mobile communication device according to the retrieved mobile communication device function configuration, and a transmitter configured to transmit the program signal to the mobile communication device.

The foregoing summarizes only a few aspects of the present invention and is not intended to be reflective of the full scope of the present invention as claimed. Additional features and advantages of the invention are set forth in the following description, may be apparent from the description, or may be learned by practicing the invention. Moreover, both the foregoing summary and following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate multiple embodiments of the invention and, together with the description, serve to explain the principles of the invention and are not intended in any manner to limit the scope of the invention.

Figure 1:
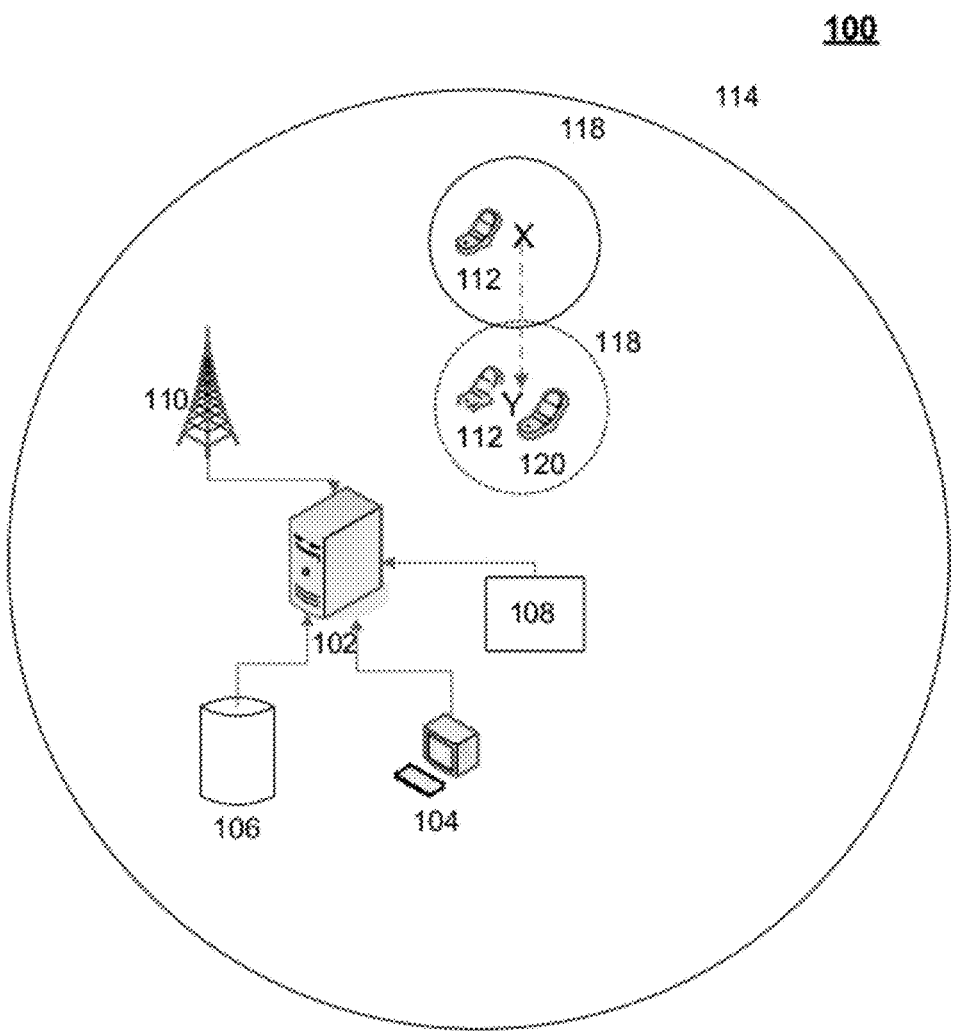
FIG. 1 is a block diagram of a system according to a preferred embodiment of the invention.

In the drawings, the same reference numbers identify identical or substantially similar elements or acts. To easily identify the discussion of any particular element or act, the most significant digit or digits in a reference number refer to the Figure number in which that element is first introduced (e.g. element 102 is first introduced and discussed with respect to FIG. 1).

Any headings provided herein are for convenience only and do not necessarily affect the scope or meaning of the claimed invention.

DETAILED DESCRIPTION OF ILLUSTRATIVE EMBODIMENTS

In the following description, numerous specific details are provided, such as specific data flows, specific methods of disabling various mobile device features to protect the privacy of a defined area, etc. to provide a thorough understanding of, and enabling description for, embodiments of the invention. One skilled in the relevant art, however, will recognize that the invention can be practiced without one or more of the specific details, or with other symbols, methods, etc. In other instances, well-known structures or operations are not shown, or are not described in detail, to avoid obscuring aspects of the invention.

In general, alternatives and alternative embodiments described herein are substantially similar to previously described embodiments, and common elements and acts or steps are identified by the same reference numbers. Only significant differences in construction or operation are described in detail.

Unless described otherwise below, the construction and operation of the various blocks shown in the referenced figures are of conventional design. As a result, such blocks need not be described in further detail herein, because they will be understood by those skilled in the relevant art. Such further detail is omitted for brevity and so as not to obscure the detailed description of the invention. Any modifications necessary to the blocks of any embodiments can be readily made by one skilled in the relevant art based on the detailed description provided herein.

Further, the following description should not be viewed as limited to either a local wireless communications system, such as a home-based wireless network, or a remote wireless communication system, such as a cellular telecommunications network. One skilled in the relevant art will recognize that the invention can be practiced in substantially similar manners in wireless communication networks of varying granularity. As described below, a wireless transmitter may be any type of device that facilitates wireless communication between one or more servers that control a wireless network and a wireless mobile device in communication with the wireless transmitter.

In a non-limiting example, in a local network, such as one in a residential home, the server may be a desktop computer, the wireless transmitter may be an access point, and the mobile device may be a laptop computer in wireless communication with the access point. In another non-limiting example, and the one used primarily in the description below, the server may be one or more network servers controlling a cellular wireless network, the wireless transmitter may be a cell site or a base station, and the mobile device may be a cell phone. Additionally, one skilled in the relevant art should appreciate that the invention described herein may be wholly local or wholly remote. Rather, the elements described may be partially local and partially remote and the communication pathways described herein are merely for convenience and do not represent any intent to limit the scope of the present invention to that particular setup.

A system and accompanying method and apparatus are described herein. The system, as is generally referred to herein, dynamically modifies the available features for use on a mobile device according to its location relative to a privacy zone around a mobile object. Some of the features may include a camera or instant messaging capabilities. In a preferred embodiment of the invention, the system monitors the location of a mobile object, and may also monitor the time, to dynamically change the configuration of the mobile device.

FIG. 1 is a block diagram illustrating an example system 100. For purposes of the following description, the mobile object is a cell phone, the use of which in the following description is not intended in any manner to limit the scope of the invention. One of skill in the relevant art should appreciate that the present invention is not limited to mobile objects that are cell phones. Rather, the invention may be used to create and implement a privacy zone around a mobile object whose location is capable of being tracked or known to some degree of certainty.

System 100 preferably has server 102 which controls system 100. Server 102 is in communication with base station 110 which provides wireless telecommunications coverage to cell 114. Server 102 is also in communication with database 106. Database 106 is used to store cell phone configuration information as well as privacy zone information. Those of skill in the relevant art should appreciate that database 106 may be one or more integral or discrete components in system 100. For illustrative purposes only, database 106 is shown as one unit.

Continuing with FIG. 1, in use, a user, another entity, or an automated system, has determined that cell phone 112, which is the mobile object, requires privacy zone 118. To assist system 100 in determining the identity of cell phone 112, the cell phone may be identified using the international mobile subscriber identity (IMSI), the international mobile equipment identity (IMEI), or any other type of identifying information specific to cell phone 112.

As described hereinabove, privacy zone 118 is an area proximate to a mobile device, e.g. in this example cell phone 112, in which certain functions of mobile devices in privacy zone 118 are disabled while another mobile device is in privacy zone 118. The user or an administrator of system 100 inputs into database 106 through input interface 104 identifying information for cell phone 112, the boundaries of privacy zone 118 surrounding cell phone 112, and the list of mobile device functions that will be disabled while a mobile device is located in privacy zone 118.

To track and monitor the location of cell phone 112 and other mobile devices in the area, locator subsystem 108 is provided. Locator subsystem 108 may be integrated with a network or act as a stand-alone system in communication with server 108. In a non-limiting example, current cellular systems provide for the capability of determining the location of a cell phone based upon triangulation of the received transmitted cell phone signal time delay as measured from three base stations in the network. In that example, locator subsystem 108 would most likely be an integrated process of server 102. In another non-limiting example, locator subsystem 108 may be a near field communication post in communication with server 102. In that example, locator subsystem 108 may be a separate apparatus in communication with server 102. In another non-limiting example, locator subsystem 108 may be integrated with a global position system. Therefore, one skilled in the relevant art should appreciate that the embodiment of locator subsystem 108 is not limited to any particular embodiment, and should understand that any embodiment capable of tracking and reporting to server 108 mobile device and/or mobile object location is considered to be within the scope of the present invention.

Locator subsystem 108 is also used to implement the boundaries of privacy zone 118 around cell phone 112. As cell phone 112 is moved from location to location, the geographic boundaries of privacy zone 118 proximate to cell phone 112 will move as well. Locator subsystem 108 monitors the location of cell phone 112 and, preferably, periodically updates server 102 with any mobile devices found in privacy zone 118.

As an example, referring to FIG. 1, point X is shown as the current geographic location of cell phone 112. Privacy zone 118, having boundaries according to the inputted information, surrounds location X, again which is the current geographic location of cell phone 112. At a certain point in time in the future, cell phone 112 has been moved to location Y. Privacy zone 118 has moved according to the location of cell phone 112 and, thusly, surrounds location Y. Privacy zone boundaries are, therefore, in relation to cell phone 112 and not in relation to the geographic surroundings of cell phone 112. To provide for the constant change in location of privacy zone 118, locator subsystem 108 tracks the location of cell phone 112 and adjusts the boundaries of privacy zone 118 in accordance with the location of cell phone 112.

As shown in FIG. 1, based upon the new location of cell phone 112 at location Y, locator subsystem has detected cell phone 120 in privacy zone 118. Locator subsystem will notify system 100 that a mobile device has been located within the boundaries of privacy zone 118. The system will in turn disable certain features of cell phone 120 in accordance with the method of FIG. 2.

Figure 2:
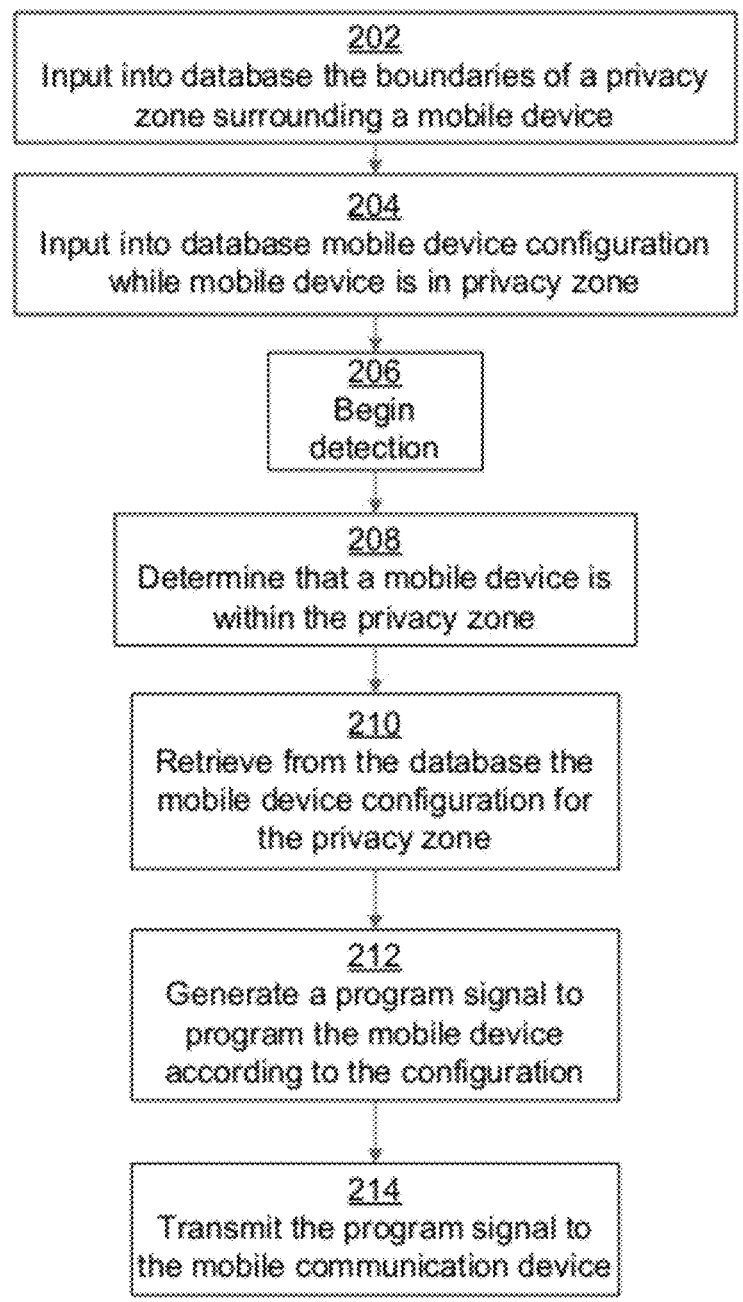
FIG. 2 is a flow diagram of a method of implementing a privacy zone in accordance with the system of FIG. 1.

In a preferred embodiment of the invention, FIG. 2 illustrates a method of creating and implementing a privacy zone around a mobile object. The method may be readily understood with reference to system 100 of FIG. 1, though one of skill in the relevant art should appreciate that the method described in FIG. 2 or other methods described below are not limited to implementation by any system in particular and may be implemented on various systems.

Continuing with FIG. 2, to begin the method, at step 202 the boundaries of the privacy zone are inputted into a database. In practice, either a user or an automated system or other means may input the information into the database. Additionally, a pre-loaded set of inputs may be inputted into the database depending upon some triggering event, such as the current time or the location of the mobile object. Once the boundaries have been inputted, at step 204 the desired configuration for any mobile devices found in the privacy zone is uploaded into a database. The configuration may not only include mobile device configuration, but also, time associated with the configuration. For example, a user may wish to change the mobile device configuration during different periods of the day. For illustrative purposes only, if the mobile device is a cell phone, various features of the cell phone may be disabled. As another illustration, if the mobile device is a laptop computer, the web camera for the laptop device may be disabled.

Once the configuration information and the boundaries have been inputted into a database, detection of mobile objects begins at step 206. The detection of mobile objects, step 206, is preferably performed in a manner in which mobile objects relatively close to or in the privacy zone are tracked but mobile objects relatively far from the privacy zone are not tracked. The actual level of granularity may depend upon system capabilities and settings. In practice, it may be likely that there are several mobile devices within some discernible distance to the mobile object. To attempt to track all of the mobile device locations and perform a determination step, step 208, may be cumbersome on the system implementing the method. Rather, it may be preferable only to track and monitor the location of mobile objects that are relatively close to the privacy zone, perhaps within several feet, or in the privacy zone. Further, it may be preferable that location information be retrieved only upon periodic time intervals. This may reduce the computational and bandwidth requirements on the system while still providing adequate privacy zone implementation.

Continuing with FIG. 2, at step 208 a mobile device has been detected and determined to be within the geographic boundaries of the privacy zone. At step 210, the mobile device configuration is retrieved from the database and a program signal according to the retrieved configuration is generated at step 212 and transmitted to the mobile object at step 214. The preferably means of programming is over the air programming, though other types of programming methods are considered to be within the scope of the invention.

Figure 3:
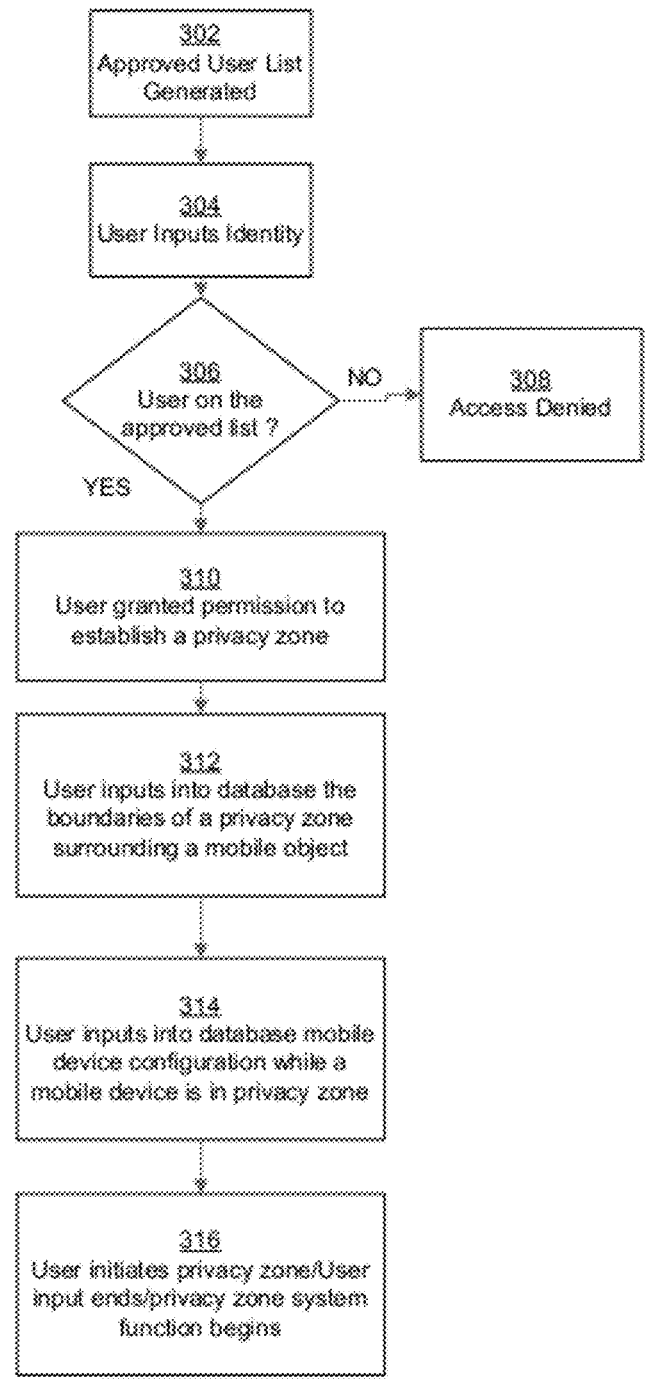
FIG. 3 is a flow diagram of a method for authenticating a user.

The ability to disable mobile device features around a mobile object may cause certain issues in implementation. In that manner, it may be preferable to require a form of authentication to verify with some degree of confidence that the establishment of the privacy zone has been approved. With reference to FIG. 3, an example of a method to authenticate approved use is provided. Those of skill in the relevant art should appreciate that the method discussed in FIG. 3 is exemplary only and other methods of authentication are considered to be within the scope of the invention.

To being the authentication process, at step 302 an approved user list is generated. In a preferred embodiment, the user list is generated by subscription to a service provided by a service provider, such as a wireless telecommunications provider. The criteria for determining that a user is approved may vary widely. For instance, if the mobile object is a person, the criteria may be the importance or employment position of the person. If the mobile object is a cell phone, the criteria may be the location of the cell phone. One of skill in the relevant art should appreciate that various forms of selection criteria are within the scope of the invention.

Continuing with FIG. 3, once the approved user list is generated at step 302, if a user desires to create a privacy zone around a mobile object, the user will input the user's identity at step 304 and the user's identity will be authenticated as an approved user at step 306. If the user is not on the approved user list, at step 308, the user will be denied access and not be allowed to establish a privacy zone. If the user is on the approved list, at step 310 the user is granted permission to establish the privacy zone, inputs the boundaries of the zone at step 312, and inputs the mobile device configuration information at step 314. Finally, the user initiates or activates the privacy zone at step 316.

One skilled in the relevant art should appreciate that portions of the invention may be embodied in the form of program code (i.e. instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. Portions of the invention may also be embodied in the form of program code that is transmitted over some transmission medium, such as over electrical wiring or cabling, through fiber optics, over a network, including the Internet or an intranet, or via another form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

It is noted that the foregoing illustrations have been provided merely for the purpose of explanation and are in no way to be construed as limiting of the invention. While the invention has been described with reference to illustrative embodiments, it is understood that the words which have been used herein are words of description and illustration, rather than words of limitation. Further, although the invention has been described herein with reference to particular structure, methods, and embodiments, the invention is not intended to be limited to the particulars disclosed herein; rather, the invention extends to all structures, methods, and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed is:

1. A computer-readable storage medium, the computer-readable storage medium not being a propagating signal, the computer-readable storage medium having stored thereon instructions for causing a processor to effectuate operations rising:

establishing a boundary of a privacy zone in relation to a location of a mobile object, wherein the boundary of the privacy zone varies in relation to the location of the mobile object;

establishing a function configuration for a mobile communication device while the mobile communication device is located in the privacy zone;

determining that a mobile communication device is proximate to the boundary of the privacy zone and not within the privacy zone;

tracking the mobile communications device while the mobile device is proximate to the boundary of the privacy zone and not within the privacy zone;

upon a determination that the mobile communications device being tracked is within the privacy zone, retrieving the function configuration for the privacy zone; and programming the mobile communication device within the privacy zone according to the retrieved function configuration.

2. The computer-readable storage medium of claim 1, the operations further comprising:

determining if a requestor that is requesting permission to establish a privacy zone is permitted to request establishment of a privacy zone; and if the requestor is permitted to request establishment of a privacy zone, granting permission to establish the privacy zone.

3. The computer-readable storage medium of claim 1, wherein the function configuration comprises at least one mobile communications device function to be disabled.

4. The computer-readable storage medium of claim 1, wherein the function configuration comprises a time associated with the function configuration.

5. The computer-readable storage medium of claim 1, wherein a determination that a mobile communication device is within the privacy zone comprises:

determining a location of the mobile object;

determining a current location of the mobile communication device;

comparing the determined current location of the mobile communication device with the boundaries of the privacy zone associated with the current location of the mobile object; and if the determined current location of the mobile communication device is within the boundaries of the of privacy zone, providing an indication that a mobile communication device is within the privacy zone.

6. The computer-readable storage medium of claim 5, wherein determining the location of the mobile communication device or the mobile object comprises detecting a near field communication enabled mobile device by a near field communication post.

7. The computer-readable storage medium of claim 1, further comprising instructions for causing the processor to program the mobile communication device within the privacy zone to implement the function configuration.

8. The computer-readable storage medium of claim 1, further comprising instructions for causing the processor to:

determine that the mobile communication device that was in the privacy zone is no longer within the privacy zone; and program the mobile communication device to re-enable any disabled features that were disabled while within the privacy zone.

9. The computer-readable storage medium of claim 1, further comprising instructions for causing the processor to:

determine if the privacy zone has been activated.

10. The computer-readable storage medium of claim 1, wherein the mobile object is a cellular telephone.

11. The computer-readable storage medium of claim 1, wherein the mobile object is a person.

12. A computer-readable storage medium, the computer-readable storage medium not being a propagating signal, the computer-readable storage medium having stored thereon instructions for causing a processor to effectuate operation comprising:

establishing boundaries of a privacy zone in relation to a location of a mobile object, wherein the boundaries of the privacy zone vary in relation to a location of the mobile object;

establishing a function configuration for a mobile communication device while the mobile communication device is located in the privacy zone;

generating a request to activate the privacy zone according to established parameters;

transmitting the request to activate;

determining a current location of the mobile object;

determining that a mobile communication device is proximate to the boundary of the privacy zone and not within the privacy zone;

tracking the mobile communication device while the mobile communication device is proximate to the boundary of the privacy zone and not within the privacy zone; and upon a determination that the mobile communications device being tracked is within the privacy zone, configuring the mobile communication device according to the function configuration.

13. The computer-readable storage medium of claim 12, wherein generating the request to activate the privacy zone is initiated by a person.

14. The computer-readable storage medium of claim 12, wherein the mobile object is a person.

15. The computer-readable storage medium of claim 12, wherein the mobile object is a cell phone.

16. The computer-readable storage medium of claim 12, wherein generating the request to activate the privacy zone is performed automatically based upon the geographic location of the mobile object.

17. The computer-readable storage medium of claim 12, further comprising instructions for causing the processor to generate a request to deactivate the privacy zone.

18. The computer-readable storage medium of claim 17, wherein generating the request to deactivate the privacy zone is initiated by a person.

19. The computer-readable storage medium of claim 17, wherein the generating the request to deactivate the privacy zone is performed automatically based upon a geographic location of the mobile object.

20. A computer-readable storage medium, the computer-readable storage medium not being a propagating signal, the computer-readable storage medium having stored thereon instructions for causing a processor to effectuate operations comprising:

establishing a boundary of a privacy zone in relation to a location of a mobile object, wherein the boundary of the privacy zone varies in relation to the location of the mobile object;

establishing a function configuration for a mobile communication device while the mobile communication device is located in the privacy zone;

determining a current location of the mobile object;

determining a location of a mobile communication device;

determining that the mobile communication device is proximate to the boundary of the privacy zone and not within the privacy zone;

tracking the mobile communication device while the mobile communication device is proximate to the boundary of the privacy zone and not within the privacy zone;

upon a determination that the mobile communications device is being tracked, retrieving the function configuration for the privacy zone;

generating a program signal to program the mobile communication device within the privacy zone according to the retrieved function configuration; and providing the program to the mobile communication device within the privacy zone.

* * * * *